June 14, 1955 V. H. BURDICK ET AL 2,710,626
SAFETY VALVE FOR FLUID CONTROL SYSTEMS
Filed Nov. 9, 1949
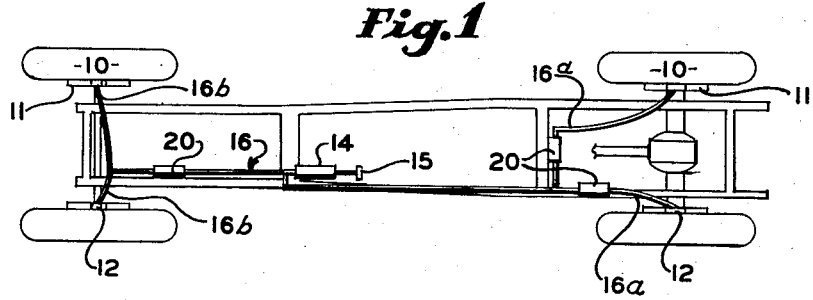
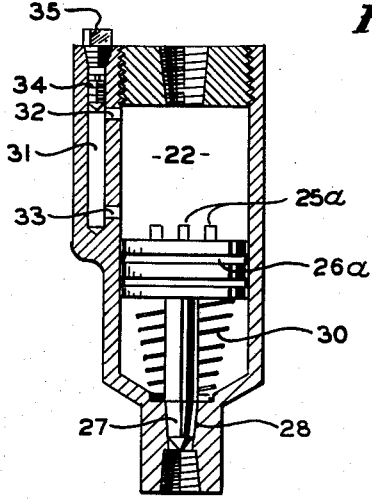
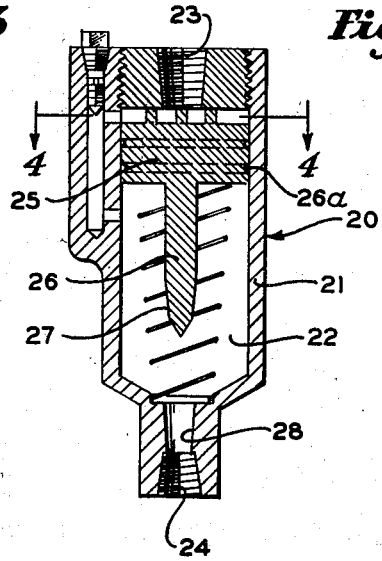
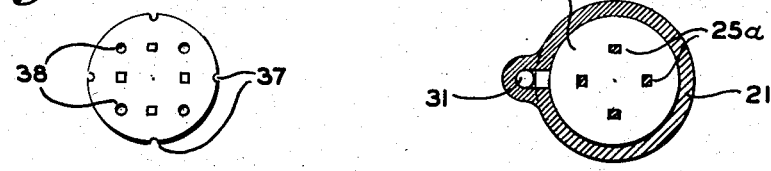
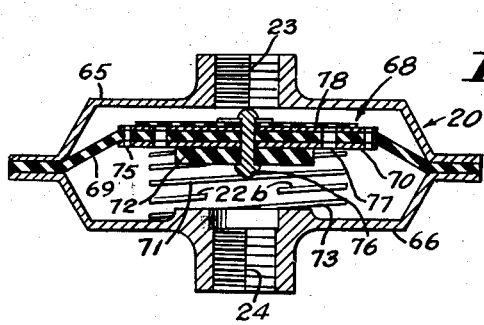
VINCENT H. BURDICK
SHERMAN R BURDICK
*INVENTORS*
BY *Knight & Rodgers*
ATTORNEYS

United States Patent Office 2,710,626
Patented June 14, 1955

2,710,626

SAFETY VALVE FOR FLUID CONTROL SYSTEMS

Vincent H. Burdick and Sherman R. Burdick, Gardena, Calif., assignors to Burdick Bros., Inc., Gardena, Calif., a corporation of California Application November 9, 1949, Serial No. 126,394

2 Claims. (Cl. 137—498)

The present invention relates generally to fluid systems for controlling or operating fluid actuated devices, and especially to a system having means for preventing loss of operating fluid and/or pressure as a result of mechanical failure of some part of the system. This invention is also concerned in detail with a safety valve structure adapted to render a fluid system able to operate at least a portion of its fluid actuated devices even though another portion of the system is incapable of operation because of loss of fluid or reduced pressure therein.

A typical example of the type of fluid system with which we are here concerned is a pressure fluid system used for operating brakes on motor vehicles. On passenger automobiles, these systems are ordinarily hydraulic systems containing oil or other liquid in the system for operating the brakes. On trucks and commercial vehicles the brakes are frequenly operated by compressed air. In either case, the system is subject to mechanical failure. This may happen in any one of a number of different ways. A coupling may leak, a metallic pipe may become bent and broken, a flexible hose may deteriorate and eventually rupture under operating pressures, or a diaphragm or similar member in the operated device may fail. Under any of these circumstances, the operating fluid is free to leave the system, whether it may leave under its own pressure as in the case of an air brake system, or whether it is forced out at the next time the brakes are applied as in the case of the conventional hydraulic brakes.

The serious nature of a sudden and complete failure of the fluid system for operating brakes is too obvious and well-known to require detailed explanation. Brake failures often times occur while the vehicle is in motion and may be traveling at relatively high speed so that it is suddenly rendered incapable of being stopped. If the brakes fail while the vehicle is traveling down a long hill or traveling on a crowded city street, accidents are almost inevitable. A particularly serious feature is that innocent vehicles and persons may suffer by being hit. Also, a substantial amount of secondary damage may result from fire as in the case of a truck carrying a cargo of gasoline or other inflammable liquid.

The pressure fluid control systems with which we are here dealing may be systems in which either a gas, such as air, or a liquid, such as oil, is used as the operating fluid. Both types of systems have many features in common because of the physical characteristics of the fluids used. However, the parts of different systems are not always interchangeable because the rate of fluid flow, pressures, density and viscosity of the fluid, and the like may be different in different systems. Generally, these systems are characterized by a single source of pressure which supplies operating fluid under pressure to two or more fluid operated units, as for example the individual brake cylinders on each wheel of the vehicle. A failure anywhere in the system allows escape of the operating fluid with a consequent reduction of pressure to the eventual point where the fluid operated devices can no longer be operated. It will be understood that our invention is not necessarily limited to braking systems in motor vehicles, but the principles thereof may be applied to any type of fluid pressure control system, of which another example is the high pressure hydraulic control system found in aircraft for operating various types of devices on the aircraft.

Hence, it becomes a general object of our invention to provide a safety valve for a fluid control system which operates automatically to retain fluid and operating pressure in a portion of the system even though another portion of the system is without sufficient fluid or pressure to function normally.

It is also an object of our invention to provide a fluid pressure operating system in which one or more elements of the system respond automaticaly to a mechanical failure in the system that causes a loss of fluid and pressure, such elements acting to maintain operating pressure in the balance of the system.

It is a further object of our invention to provide a valve for fluid pressure operating systems which is automatically responsive to abnormal pressure differentials within or across the valve to check fluid flow therethrough, while the valve does not respond to normal differentials of pressure encountered during normal operation and thus permits fluid to flow through the valve in either direction for normal operation of the system.

These and other objects of our invention have been attained by combining with the conduit means connecting a pressure operated device to a common source of pressure, a safety valve located in the conduit means leading to one or a group of pressure operated devices. The safety valve is responsive to an excessive pressure drop across the valve in the event of a mechanical failure causing loss of fluid or pressure in the system when the failure occurs at one or a group of pressure operated devices or in the conduit means between the safety valve and such devices. By virtue of operation of the valve normal operating pressures are maintained within the remainder of the fluid system.

The valve structure for use in the pressure system comprises a body provided with an interior chamber having a first port communicating with the source of pressure and a second port communicating with the device operated by fluid pressure. Within the interior chamber is a movable valve member which is shifted in position in response to pressure differentials occurring within the chamber or across the valve. Limited travel of the valve member may result from normal pressure differentials occurring under normal rates of fluid flow through or from the safety valve; but if the pressure differential becomes excessive in one direction as a result of failure of a part of the system to maintain the necessary pressure, the movable valve member seals off the second port in the body and prevents further fluid flow from the safety valve.

How the above objects and advantages of our invention, as well as others not specifically referred to herein, are attained will be better understood by reference to the following description and to the annexed drawings, in which:

Fig. 1 is a diagram of a wheeled vehicle with a hydraulic brake system embodying our invention;

Fig. 2 is a longitudinal median section through a preferred form of safety valve structure designed according to our invention, the valve being in normal position allowing free fluid flow;

Fig. 3 is a section similar to Fig. 2 with the movable valve member in closed position stopping fluid flow through the valve structure;

Fig. 4 is a transverse cross section on line 4—4 of Fig. 2;

Fig. 5 is a plan view of the end of a piston, as in Fig. 4, showing a modified form of piston with fluid passages therein; and Fig. 6 is a median section illustrating a further modification of our invention with a diaphragm used for the movable valve member in place of a piston.

Fig. 1 illustrates diagrammatically a typical fluid pressure system in a wheeled vehicle, as for example a passenger automobile, installed according to our invention. On each of the four wheels 10 is a brake 11 operated by an individual fluid actuated cylinder 12 or similar brake actuating means operated by fluid under pressure. The source of fluid pressure is master cylinder 14 in which pressure is built up by the driver by pressing on brake pedal 15 or other similar member directly manipulated by the vehicle operator for the purpose of setting or controlling the brakes. From master cylinder 14, fluid under pressure is transmitted through suitable conduit means, usually comprising metallic tubing together with lengths of flexible hose where necessary. This conduit means is indicated generally at 16 in Fig. 1. Branch lines 16a lead one to each of the rear wheel brake assemblies and in each branch line 16a is a safety valve 20. In the event of mechanical failure causing leakage of fluid at one rear wheel, the associated valve 20 stops the passage of fluid from the valve to line 16a leading to that wheel and maintains fluid pressure within the rest of the system. By placing a valve 20 in each branch line 16a, only a single brake cylinder 12 is cut off by operation of a valve 20.

It may be desirable under some circumstances to take out of operation more than one pressure operated unit, and such an arrangement is shown in connection with the front wheels of the vehicle in Fig. 1. Here branch lines 16b each lead to one of the front brake assemblies; and safety valve 20 is placed in the conduit means between branch lines 16b and master cylinder 14. As a result, if the forward valve 20 closes, in response to leakage in either line 16b or either front brake, the application of braking pressure is discontinued to both the front wheel cylinders 12, regardless of which one may have otherwise been rendered inoperative. This arrangement has the advantage that the drag of a single brake in front does not then interfere with steering the vehicle; but if the advantage of the additional brake action is considered to outweigh the disadvantages, a valve 20 may be placed in each branch line 16b as in the rear of the vehicle. Likewise, a single valve 20 may be used for both rear wheels.

There is illustrated in Figs. 2–4 a preferred form of safety valve constructed according to our invention. This valve 20 has a body 21 formed with an interior chamber 22, preferably of circular cross section. At one end of body 21 is port 23 by which interior chamber 22 communicates with a source of pressure, such as master cylinder 14, through conduit means 16. The conduit means for this purpose is not illustrated in Fig. 2, but it may be any conventional type of metal tubing or hose, either rigid or flexible. In a similar manner, port 24 at the other end of the body provides means whereby the valve is connected to other elements of conduit means 16 to place interior chamber 22 in communication with brake cylinder 12 or other pressure operated device. Ports 23 and 24 may have threaded portions to receive conventional fittings.

Located inside chamber 22 is movable valve member 25 in the form of a piston which is circular in cross section to engage the inner walls of chamber 22 and is movable axially within the chamber in response to differences in fluid pressures at the two sides of the piston. Piston 25 may be of any conventional design and has sufficient axial length that it is guided during movement by its engagement with body 21. Piston rings or packing of a suitable type may be provided at 26a to improve the fluid-tight character of the engagement with the chamber walls.

At one side, piston 25 is provided with stem 26 the end of which is tapered at 27 to provide a conical valve seat or sealing member. This movable valve seat cooperates with stationary valve seat 28 in the body walls when the movable valve member is at the extreme range of its travel downwardly, in order to seal off port 24 from chamber 22, as shown in Fig. 3.

Spring 30 in chamber 22 bears against body 21 and against the under side of piston 25 to urge the piston toward the end of the chamber adjacent port 23 which communicates with the source of pressure. Movement of the piston toward port 24 and in a direction to effect interruption of fluid flow is opposed by spring 30.

Fluid passage means is shown in Figs. 2 and 3 for the purpose of allowing a limited flow of fluid from one side of piston 25 to the other. The passage means are here shown as being located in body 21 of the valve and comprise an axially extending passage 31 drilled in boss 21a and communicating with chamber 22 by means of two spaced ports 32 and 33. The upper end of passage 31 is closed by screw 34 which is preferably positioned to close port 32 to a greater or lesser extent as may be desired. This permits regulation of the rate of fluid flow through port 32 and hence through passage 31. If desired, port 32 can be closed completely. Hence screw 34 also functions as a valve in the fluid passage means adjustable to regulate flow from one side of piston 25 to the other. Screw plug 35 may be inserted in the end of passage 31 above screw 34 to protect the latter and to keep out dirt.

Port 32 at the upper end of by-pass 31 is located above the extreme range of travel of piston 25 toward the end of chamber 22 that is adjacent port 23 in order that the piston at no time covers the entrance to passage 31. To insure that the piston does not block this end of the by-pass, one or more stops 25a may be provided on the valve body or on the piston (as in Fig. 4) to limit the travel of the piston to approximately the position shown in Fig. 2.

The other end of by-pass 31 is sufficiently distant from the opposite end of chamber 22 that piston 25 closes off the by-pass before reaching the end of its downward travel. With the proportions shown in Fig. 3, the by-pass is closed when piston 25 has gone about half way to the closed position. After this, the full pressure from the pressure source is applied through port 23 to the upper face of the piston and the piston continues to move downwardly until the cooperating valve seats 27 and 28 engage to stop the piston and seal off port 24 from interior chamber 22, when the piston is in the position of Fig. 3. Seats 27 and 28 may take other forms than shown; but they are preferably of a slightly tapered shape so that as the piston is driven forward under pressure, the friction between surfaces 27 and 28 is sufficient to hold the piston in the sealing position against the force exerted by spring 30 tending to disengage seats 27 and 28. Any residual pressure on piston 25 from the source of pressure is an aid in keeping the tapered surfaces in mutual engagement.

The net area of the fluid passage means 31, 32, 33 is preferably such that fluid can pass through this passage means at a rate substantially equal to the maximum rate at which it may be discharged through port 24 for operation of the fluid operated device connected thereto. As a result, when pressure is applied normally from the source through port 23, piston 25 has little or no travel downwardly within chamber 22 and the fluid which is delivered to the fluid operated device is largely fluid flowing through body 21. On the other hand, if port 32 is closed, piston 25 acts as a pressure transfer member and it moves down in the chamber to displace fluid therefrom, the fluid delivered to the fluid operated device, such as 12, being equal to that displaced from chamber 22. For this reason, the net volume of chamber 22 between the under side of piston 25 and the end adjacent port 24 is preferably made substantially in excess of the volume of fluid required to operate the fluid operated device to which the valve is connected by conduit means at port 24. Although chamber 22 may be made larger if desired, it is believed adequate if the volume of the chamber is such that approximately one and a half times the volume of fluid required to operate the operated device can be expelled from chamber 22 before fluid discharge from port 24 is interrupted by engagement of sealing means 27 and 28.

As explained, screw 34 may be adjusted to regulate fluid flow through passage 31 and can shut off all flow. A valve 20 of this type in which there is no provision for even limited flow of liquid around piston 25 is satisfactory whenever the conduit means and pressure operated device are completely free of any leakage. If leakage occurs, there is no way to replenish lost liquid from the remainder of the system.

One of the principal reasons for providing fluid passage means, as at 31, is always to permit a flow of fluid through valve 20 of sufficient proportions to replace fluid lost by leakage in the system, which is a usual and normal occurrence. For this purpose alone the area of the fluid passage means may be quite small. However, the area of the fluid passage means must be substantially larger than this minimum in order to permit return flow of the liquid at a rate sufficient to insure that the brakes do not remain set or operation of the actuated device is not unduly prolonged.

Under ordinary operating conditions application of fluid under pressure from the source to the fluid actuated device through valve 20 causes fluid flow through the valve at a maximum rate which can be determined. Since by-pass 31 is able to pass fluid at this rate, there is comparatively little pressure drop across valve 20 and a correspondingly low differential between the pressures above and below piston 25. However, should a break occur in the system at a point beyond valve 20, that is in the branch conduit or in the fluid operated device itself, such that operating fluid can no longer be retained within the system, pressure at the point of the break becomes zero. This produces an excessive pressure drop across valve 20 and the resultant pressure differential effective on piston 25 is sufficient to move the piston toward port 24 in opposition to spring 30. As soon as the piston has traveled sufficiently to close port 33, the full operating pressure is applied to the upper surface of the piston and it is forced to the end of its travel where valve seats 27 and 28 engage one another and prevent further flow of fluid from port 24. This seals off the remainder of the system from the point of the break and permits the remainder of the system to retain operating pressure and actuate the other pressure operated devices in the system.

There is illustrated in Fig. 5 a modification of our invention which is the same in all respects as the valve shown in Figs. 2 and 3 except that the passage means for conducting fluid from one side to the other of piston 25 has been changed. In the form of Fig. 5, this passage means is located in the piston and is provided by slots 37 cut in the periphery of the piston and by holes 38 drilled axially through the piston at positions inwardly of the periphery. Passages of this kind may be used in any combination or arrangement to give sufficient area for fluid flow past the piston as may be desired. The action of the piston is substantially the same as with the single passage 31 in the valve body.

A further modification of our invention is illustrated in Fig. 6. This form of safety valve is designed especially for use in a fluid control system in which the source of pressure supplies a continuous fluid pressure at one side of the movable interior valve member. This situation is normally present in air brake systems; but it will be understood that this form of valve is not necessarily limited to use with gaseous fluids but may also be used with liquids.

The body of safety valve 20 is formed of two cooperating sections 65 and 66 which have matching marginal flanges by which the two body sections may be fastened together. The upper body section 65 has inlet port 23 which is in communication with the source of pressure to receive fluid therefrom. The lower section 66 has an outlet port 24 in communication with the fluid operated device for discharge of fluid to said device. Between them the two body sections enclose an interior chamber 22b.

Within chamber 22b is located the movable valve member 68 which is of the diaphragm type. It comprises a flexible member 69 which is restrained around its entire margin by being held between the flanges of body sections 65 and 66. A pair of metal discs 70 are attached at opposite sides to the central portion of flexible diaphragm 69 in order to stiffen this member; but discs 70 are of sufficiently small diameter that they are entirely surrounded by an unsupported flexible section of diaphragm 69. This permits the discs to move freely within chamber 22 from a normal position toward the end of the chamber adjacent port 23 to a position in chamber 22 adjacent outlet port 24. In this latter position, movable valve member 68 seals port 24 to prevent fluid flow from the port. The diaphragm is normally maintained in the position of Fig. 6 by compression spring 71 which opposes movement of the diaphragm towards the sealing position.

In order to avoid a metal-to-metal contact, we prefer to attach disc 72 of yielding material to the underside of valve member 68. This yielding member when brought into contact with the up-standing collar 73 at the upper end of port 24 which functions as a valve seat forms a fluid-tight seal with collar 73, which is preferably formed as a part of body section 66.

Valve member 68 is provided with fluid passage means, in order to permit flow of fluid from either side of the diaphragm to the other, in the form of a plurality of openings 75 in the diaphragm. At normal rates of fluid flow through chamber 22b to operate the fluid actuated device, fluid flows through openings 75 and thence out port 24. Spring 71 is designed to exert a force on the diaphragm substantially equal to the pressure differential on valve 68 resulting from this fluid flow through valve 20 at the normal maximum rate. When the rate of fluid flow becomes excessive as a result of a mechanical failure or the like causing fluid to escape to the atmosphere, and as a consequence the pressure drop across valve 20 likewise becomes excessive, spring 71 is compressed and the diaphragm is moved downwardly into a position in which port 24 is closed to prevent discharge of fluid from the port. In an air brake system there is ordinarily always sufficient fluid pressure supplied through port 23 to maintain the valve member in the closed position, once it has reached that position, and it is not necessary to provide any frictional or mechanical locking means engaging the valve to hold it in closed position. Normal fluid pressure at one side of the diaphragm is sufficient for this purpose.

The valve of Fig. 6 constructed as so far described is particularly suited to a compressed air system. Ordinarily in a system of this type substantially all of the fluid flow is in the forward direction, that is from port 24 to the fluid operated device. The used air is generally exhausted to the atmosphere through an unloading valve, eliminating any large amount of reverse flow through valve 20. To adapt this form of valve to a liquid system, it may be desirable to modify it slightly by adding a second fluid passage means in the form of openings 77 in the movable valve member and an auxiliary valve 78 which covers and closes the upper ends of openings 77. The parts are held assembled by a bolt or rivet 76. Valve 78 is a flexible disc of leather, rubber, thin metal, or the like; or a spring pressed disc may be used. When the brake pedal is released, the brakes or other fluid actuated devices are released as rapidly as reverse fluid flow, that is flow from port 23, can occur. During reverse flow, flexible valve 78 uncovers ports 77 to facilitate fluid flow into the upper portion of chamber 22b. Since existence of a higher pressure in the upper portion of the chamber causes flexible valve 78 to close openings 77 the presence of these openings does not modify operation of this form of the valve from the operation already described.

Valved openings 77 may be used in either air or hydraulic systems to permit a greater rate of flow through valve 20 in one direction than in the other because ports 77 are open to permit flow in one direction only. In any fluid pressure system, such as a brake system, this construction is adapted to rapid release of the brake cylinder or other actuated device without material displacement of the diaphragm from the normal rest position since reverse flow at a rate greater than the normal or predetermined rate is possible. Opening ports 77 to reverse flow prevents the valve from acting as a check valve except when forward flow is greater than desired.

We prefer to provide a spring 71 to urge the diaphragm to the normal open position. However, it is within the scope of our invention to make diaphragm valve member 68 of material having sufficient inherent elasticity to keep port 24 open at normal rates of flow, but close the port when the flow rate is excessive.

In view of the foregoing description of preferred embodiments of our invention, and certain modifications thereof, it will be apparent that various changes in the detailed construction of a safety valve and arrangement of the parts in the fluid system may be made by persons skilled in the art without departing from the spirit and scope of our invention. For example, in the form of Fig. 5, the flexible slots or holes in the piston may be freely substituted one for the other and either type of opening omitted entirely. Or this type of passage means may be substituted for the by-pass of Fig. 3, and vice versa. Obviously, we are not necessarily limited to locating passage 31 in the body of the valve, but it would be within the scope of our invention to use a tube outside of the valve body connecting ports 32 and 33. We have disclosed a construction in which the movable valve member is kept in engagement with the outlet port by fluid pressure, or by friction produced by a wedging action. In general, these elements may be interchanged. It is further within the scope of our invention to use either a diaphragm or a piston for the movable valve member. Consequently, we wish it understood that the foregoing description is considered as illustrative of rather than limitative upon, the appended claims.

We claim:

1. In a valve structure for use in a pressure fluid system, the combination comprising: a body provided with an interior chamber having a first port and a second port; a flexible diaphragm within said chamber and constrained at its periphery to divide the interior chamber into two portions each in communication with one port, said diaphragm being movable in response to differences in fluid pressure at opposite sides of the diaphragm between a normal position in which both of the said ports are open and a second position in which said second port is closed by the diaphragm; fluid passage means in the diaphragm located radially outwardly of the area of engagement with said second port and permitting fluid flow through the diaphragm at a predetermined rate creating sufficient pressure differential to move the diaphragm to said second position when the fluid flow into the valve exceeds said predetermined rate; a second fluid passage means in the diaphragm located radially outwardly of the area of engagement with said second port and permitting fluid flow through the diaphragm; and valve means mounted on the diaphragm permitting fluid flow through said second fluid passage means only in one direction from the second port toward the first port.

2. In a safety valve structure for a pressure fluid system, the combination comprising: a body enclosing an interior chamber and having a first port and a second port; a flexible diaphragm extending across the chamber and dividing said chamber into two separate portions each in communication with one port, said diaphragm being movable toward and away from said second port in response to fluid pressures at opposite sides of the diaphragm, said diaphragm having a centrally positioned sealing member and said second port being centrally located relative to the diaphragm to be closed by said sealing member upon existence of an excessive rate of fluid flow from the first port to the second port; a fluid passage in the diaphragm spaced radially outwardly from the sealing member permitting fluid flow through the diaphragm at all positions of the diaphragm; a second fluid passage in the diaphragm spaced radially outwardly from the sealing means; and a flexible valve mounted on the diaphragm at the side of the first port closing said second fluid passage to fluid flow from the first port to the second port but permitting fluid flow in the reverse direction.

References Cited in the file of this patent

UNITED STATES PATENTS

| Number | Name | Date |
|---|---|---|
| 1,154,962 | Bayles | Sept. 28, 1915 |
| 1,477,261 | Hart | Dec. 11, 1923 |
| 1,897,155 | Vaughn | Feb. 14, 1933 |
| 1,899,235 | Du Pont | Feb. 28, 1933 |
| 2,093,015 | Madden | Sept. 14, 1937 |
| 2,166,746 | Best | July 18, 1939 |
| 2,216,570 | Hollingshead | Oct. 1, 1940 |
| 2,219,408 | Benz | Oct. 29, 1940 |
| 2,462,189 | Hess | Feb. 22, 1949 |
| 2,497,906 | Peters | Feb. 21, 1950 |